United States Patent [19]
Riedel et al.

[11] Patent Number: 5,321,601
[45] Date of Patent: Jun. 14, 1994

[54] APPARATUS FOR CONTROLLING FLOW IN A SEWER REGULATOR

[76] Inventors: Dennis S. Riedel, 5711 Newman Rd., St. Clair, Mich. 48079; Steven A. Kerr, P.O. Box 20, Marysville, Mich. 48040

[21] Appl. No.: 843,262

[22] Filed: Feb. 28, 1992

[51] Int. Cl.⁵ .............................................. G05D 7/00
[52] U.S. Cl. .................................. 364/141; 364/146; 364/509; 137/395
[58] Field of Search ............... 364/509, 510, 140–147; 137/395, 390, 554

[56] References Cited

U.S. PATENT DOCUMENTS

| | | | |
|---|---|---|---|
| 4,277,832 | 7/1981 | Wong | 364/510 |
| 4,581,707 | 4/1986 | Millar | 364/509 |
| 4,816,987 | 3/1989 | Brooks et al. | 364/510 |
| 5,078,180 | 1/1992 | Collins | 137/554 |
| 5,172,332 | 12/1992 | Hungerford et al. | 364/510 |

FOREIGN PATENT DOCUMENTS

| | | | |
|---|---|---|---|
| 55-46139 | 3/1980 | Japan | 364/510 |
| 928299 | 5/1982 | U.S.S.R. | 364/510 |
| 2141212 | 12/1984 | United Kingdom | 137/554 |

OTHER PUBLICATIONS

Hitachi Review vol. 27, No. 3, Kashiwagi et al., 1978, pp. 146–152.

Primary Examiner—Jerry Smith
Assistant Examiner—Steven R. Garland

[57] ABSTRACT

A Gate valve is controlled in a Sewage Regulator by incorporating a Hydraulic System, a Programmable Logic Controller, and a Level or Depth Measuring device. By using this method, setpoint control can be utilized and the setpoint readily changed and verified. Also it is possible to display information and input setpoint changes via an operator interface without means of programming device. Communications to a Serial Printer can also be achieved by connecting to the Serial communications port of the PLC, this allows a hard copy of the information on alarms or other relevant data. Control of other external devices can also be achieved by suitably programing the PLC to manipulate the various outputs of the Contact Output Module to automatically control a Sampling Device or other such equipment which responds to a Contact closure, Pulsed Signal, or voltage output.

7 Claims, 9 Drawing Sheets

APPARATUS FOR CONTROLLING FLOW IN A SEWER REGULATOR

BACKGROUND OF THE INVENTION

This invention is a new way of controlling the flow of wastewater in a sewage regulator by integrating the use of Ultrasonic level measurement or Submersible Depth Transducer, Programmable Logic control, and a hydraulic cylinder and pump for manipulating a control valve. The typical method of control of a valve in a sewer regulator is by a float assembly attached to the control valve. The control of the valve is achieved by a system of pulleys attached to a shaft which rotates. The pulleys are each attached to the valve and float by means of a chain. Setpoint adjustment for water level and length of stroke are determined by proper sizing of the pulleys and by addition of weights to the float. This method of control typically requires repeated maintenance to the mechanical workings and setpoint change requires changing of the pulleys. In addition, actual water level measurements can not be determined and thus determination of proper operation is difficult.

With the advent of programmable logic controllers, ultrasonic level measurement devices and Submersible Depth Transducers a method can now be implemented to control the control valve integrating the use of the aforesaid devices and in combination with a hydraulic cylinder and pump. This method is henceforth more advantageous because level setpoint can be readily changed and verified, and maintenance is minimized by the reduction of mechanical devices. Another improvement is also gained by the increased mechanical advantage due to the greater force imparted to the control valve by the hydraulic system. Further, manual operation of the control valve can be achieved for the purposes of testing or maintenance.

SUMMARY OF THE INVENTION

The object of this invention is to provide a method of controlling flow in a sewer regulator, which method integrates the use of an ultrasonic level measuring device or Submersible Depth transducer, a programmable logic controller, a hydraulic cylinder and pump system, and a control valve. Another object of this invention is to provide variable setpoint control by entering said setpoint via an operator interface to the programmable logic controller. Feedback on control operation is also displayed on an alphanumeric 16 character display. The objects of this invention are achieved in the following manner. By suitably programming a Bernecker & Rainer Mini Programmable logic controller PLC with an Analog Input Interface Module, a Digital Input Module, an Operator Panel Interface Module, an Operator Panel, an Output Module, and a Numerical Central Processing Unit with Serial Communication Port, the PLC will be enabled to control the connected hardware and thereby achieve the objects of this invention in the following manner:

An Ultrasonic Level Measuring Device or Submersible Depth Transducer is connected to the Analog Input of the PLC. The Analog signal is processed in a PID Loop by software which is programmed to convert the analog signal to a digital signal. A data table is set up with the PID algorithms which can be adjusted for the particular application needs. Also programming is taken into consideration for conversion of Analog input signals to Physical Units as determined by the specific factors of each application. The Linear regression or conversion of analog input values is used to convert the binary values as determined by the analog to digital conversions into a format which reflects its physical equivalent. This operation facilitates the easy use of the operator interface setpoint by which a person can enter in the physical setpoint desired and the conversions are done by the software. More specifically the closed loop PID control will maintain the operator entered physical setpoint at the desired value by measuring the process variable by an Ultrasonic Level Measuring Device which is inputed into the PLC via an Analog Interface Module. The Desired level is then compared to the actual level and the difference between them is calculated. The Valve is then manipulated by the output or control signal to adjust in such a way as to bring the control difference to zero. The output signal in this invention is configured by the software as to give pulsed outputs to two separate relays. One relay is energized only for upward movements to the valve and the other relay is dedicated to downward movements. The relays are connected to valves on a hydraulic pump which in turn is connected to a hydraulic cylinder. By manipulating each valve connected to the hydraulic pump the direction of flow of hydraulic fluid through the cylinder can be changed thereby allowing the extension or retraction of the piston in the hydraulic cylinder. The hydraulic cylinder being connected to the control valve allows an easy and dependable method of opening and closing the valve. Limit switches are positioned along the piston to indicate full open and closed positions. The limit switches are then connected to the Digital Input Module on the PLC via a +24 VDC signal. The limit switches are used by the software to limit overtravel of the control valve and also to determine when control is not needed to shut down the system to save power and wear on the components of the hydraulic system and valve.

DETAILED DESCRIPTION

As this method of controlling the flow of sewage can be adapted to many different types of structures only a typical application in which its use is suited has been selected. Many different appurtenances to the structure may be used and I have detailed but one application. As this is a process utilizing specific elements which are detailed in the various drawings included below all the components I listed below with accompanying referenced numerals. The components are Hydraulic Cylinder 6, Hydraulic Hoses 16 and 18, Hydraulic Cylinder mounting bracket 17, Limit Switch Mounting Bracket 23, Limit Switches Upper 5 and Lower 22, Limit Switch Actuator 21, Limit Switch Electrical Cables upper 4 and lower 10, Ultrasonic Transducer 9, Ultrasonic transducer Mounting Bracket 8, Ultrasonic Level Meter Coaxial Cable 12, Ultrasonic Level Meter 25, Operator Interface Panel and PLC 33, Hydraulic Pump 31, Hydraulic Solenoid Valve Assembly 32, Solenoid Electrical Cable Up 29, and Down 30, Hydraulic Pump Power Cable 34, System Power Cable 35, Motor Relay 46, Up and Down Solenoid Relays 47, 48, and the elements of the PLC which are the Analog Input Module 41, the Digital Input Module 42, the Contact Output Module 43, the Central Processing Unit 44, the Serial communications Port 50, the Operator Panel Interface Module 40 and the Power Supply 45. Also needed is a +24 VDC Power Supply 49, to power the PLC, Solenoids, Relays, and the limits for Inputs.

Figure 1:
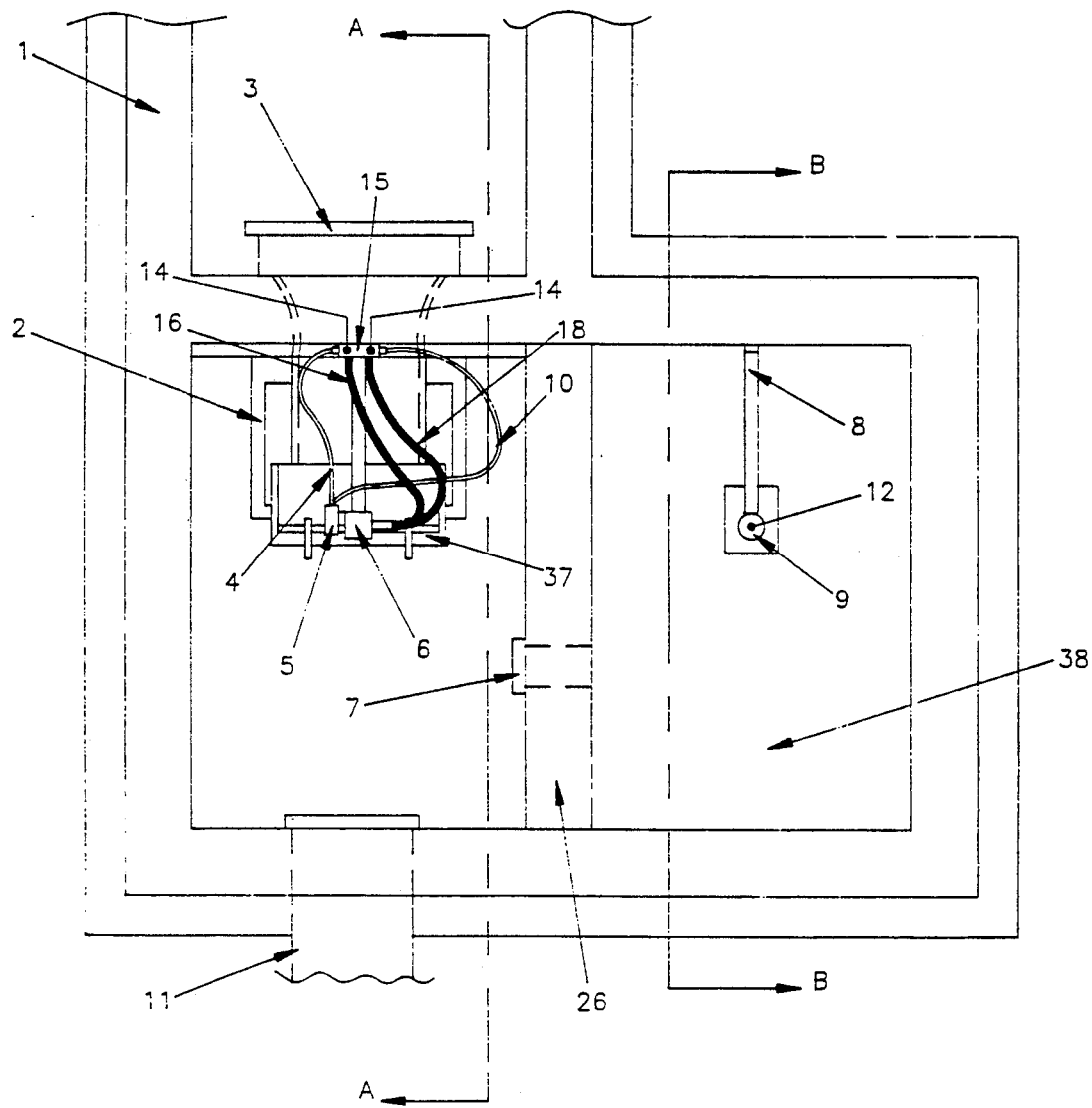
FIG. 1 is a top view of the layout of the overflow regulator chambers with the components of the present invention installed in a typical fashion.
Figure 2:
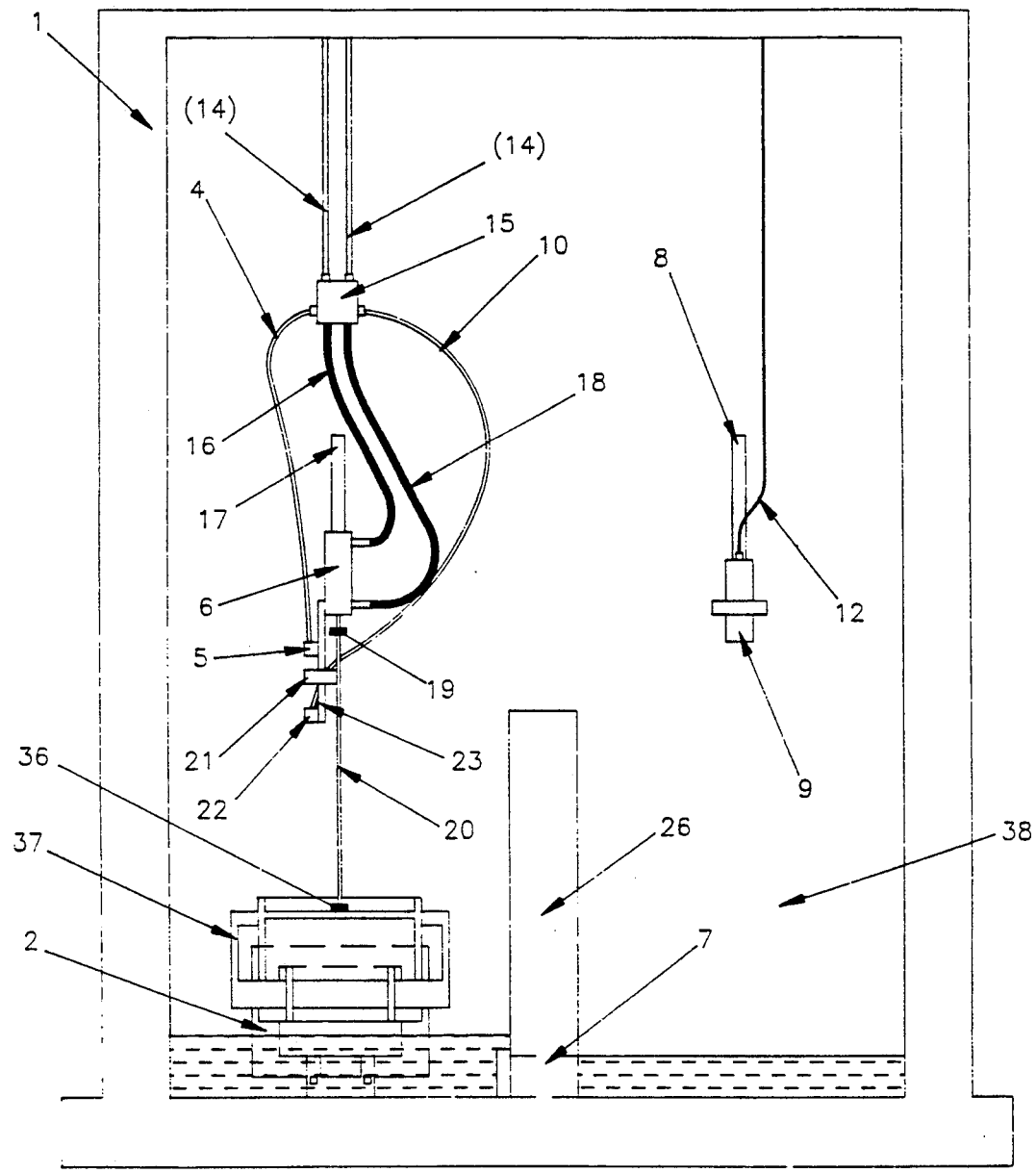
FIG. 2 is a front view of the present invention showing the regulating chamber and the stilling well.
Figure 3:
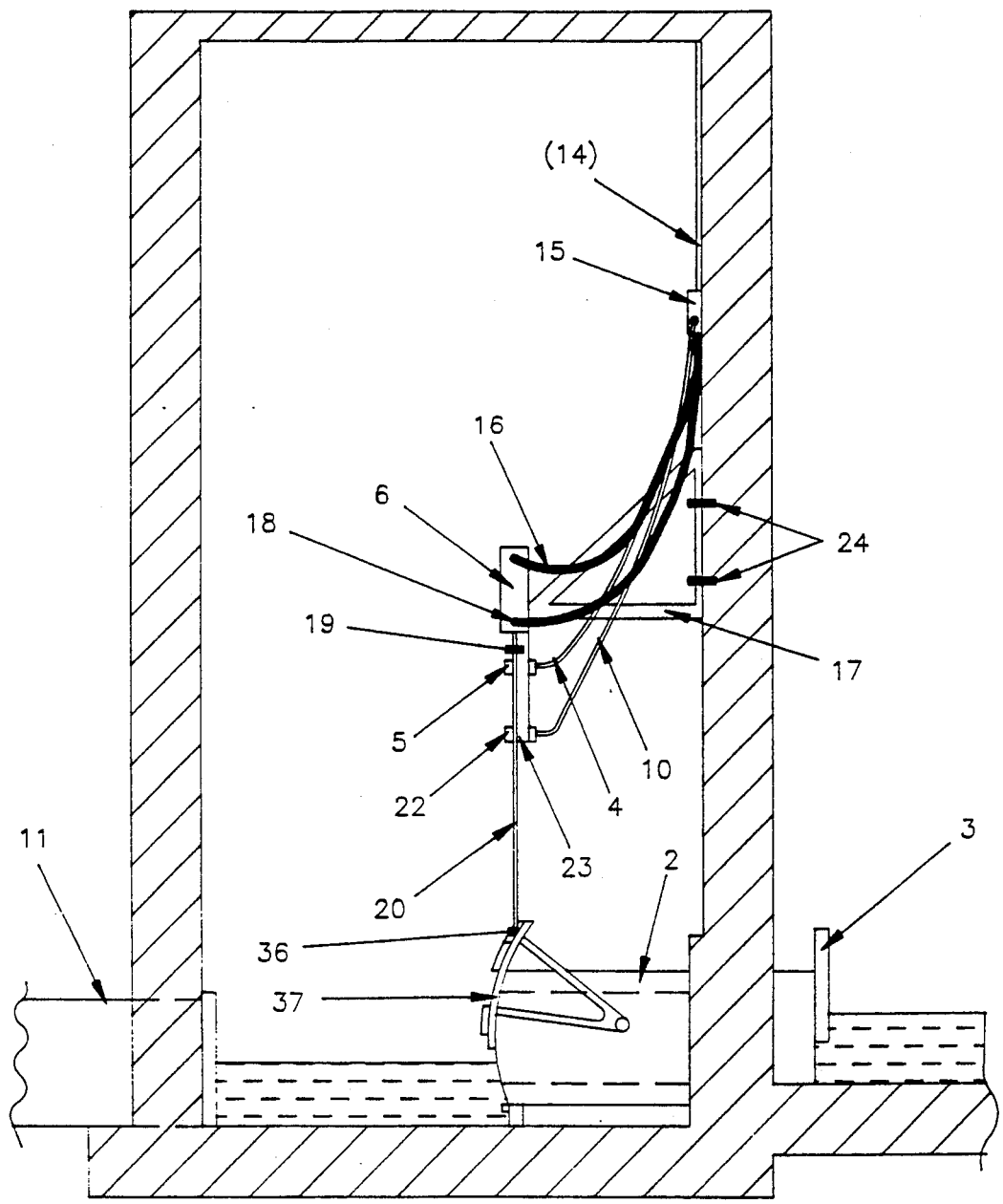
FIG. 3 is a view of the chamber holding the hydraulic cylinder, control valve and limit switches taken along line A—A indicated in FIG. 1.

As shown in FIGS. 1 and 2, Structure 1 is the element which holds the equipment to be controlled by the new method. It compromises the two chambers which are the Stilling Well 38 and the Regulating Chamber 39 which are formed by means of the Divider wall 26. The chambers are used to regulate the flow and measure the height of the sewage respectively. A Gate Valve 37 attached to a Gate Valve shell 2 is used to control the flow of sewage from the Inlet Pipe 3 through the Gate Valve 37 and then to the Outlet Pipe 11. The Stilling Well 38 communicates with the level being regulated to the Outlet Pipe 11 by means of a Pipe 7 interconnecting it to the Regulating Chamber.

Figure 4:
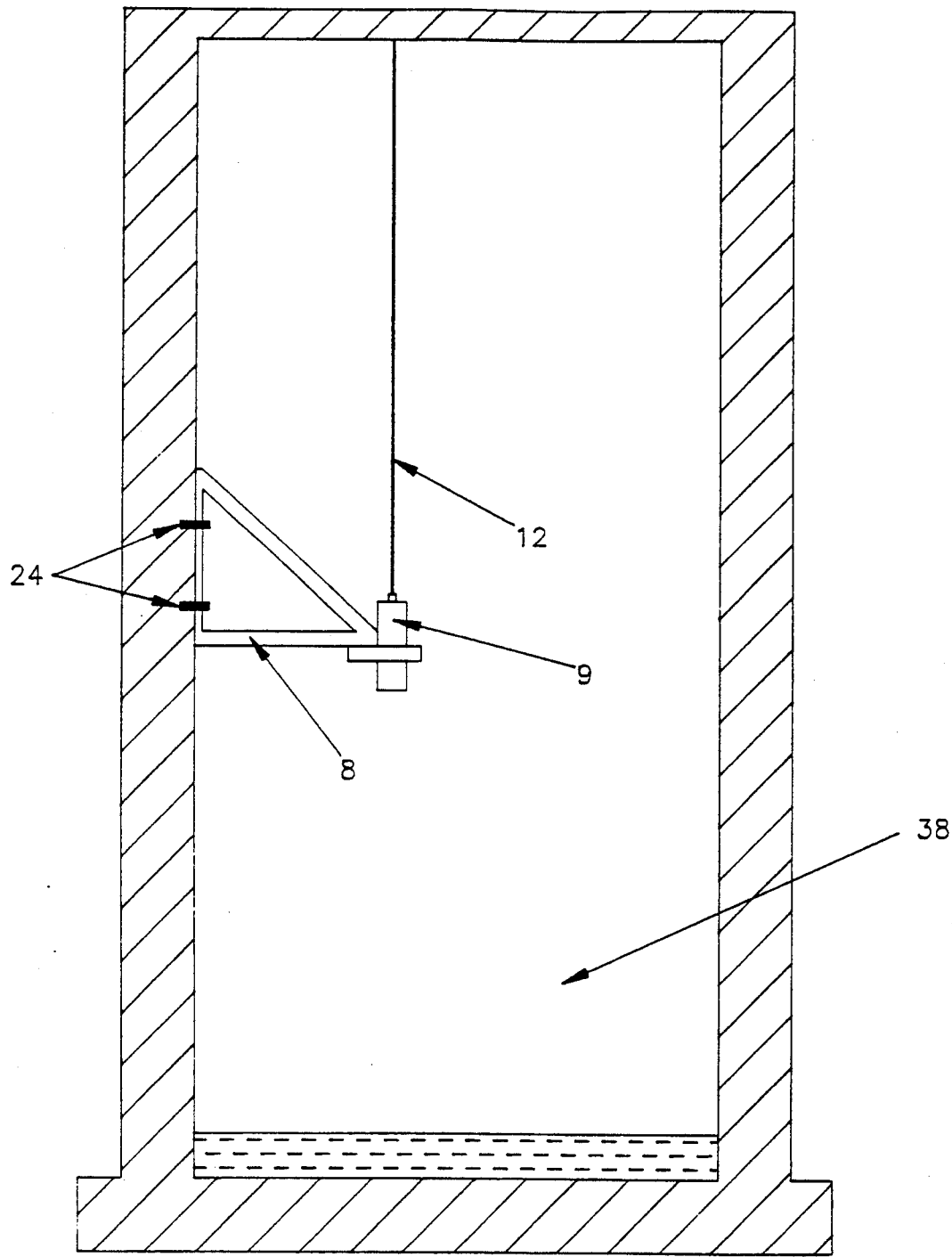
FIG. 4 is a view of the present invention taken along line B—B of FIG. 1 and details the stemming well chamber holding the ultrasonic transducer used in level measurement.
Figure 5:
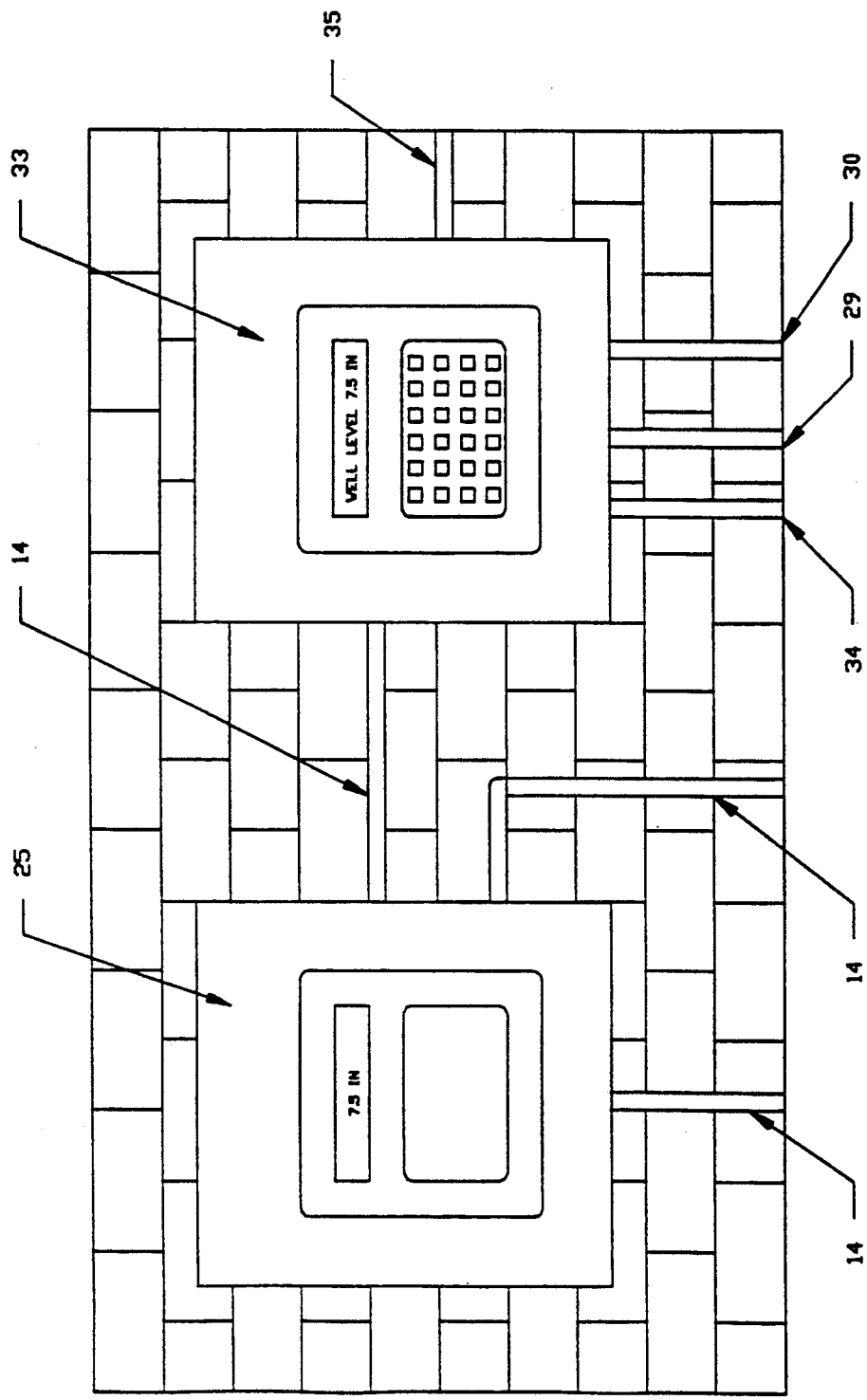
FIG. 5 is a view of the present invention detailing the enclosures housing the ultrasonic level meter and the PLC with the operator interface panel.
Figure 6:
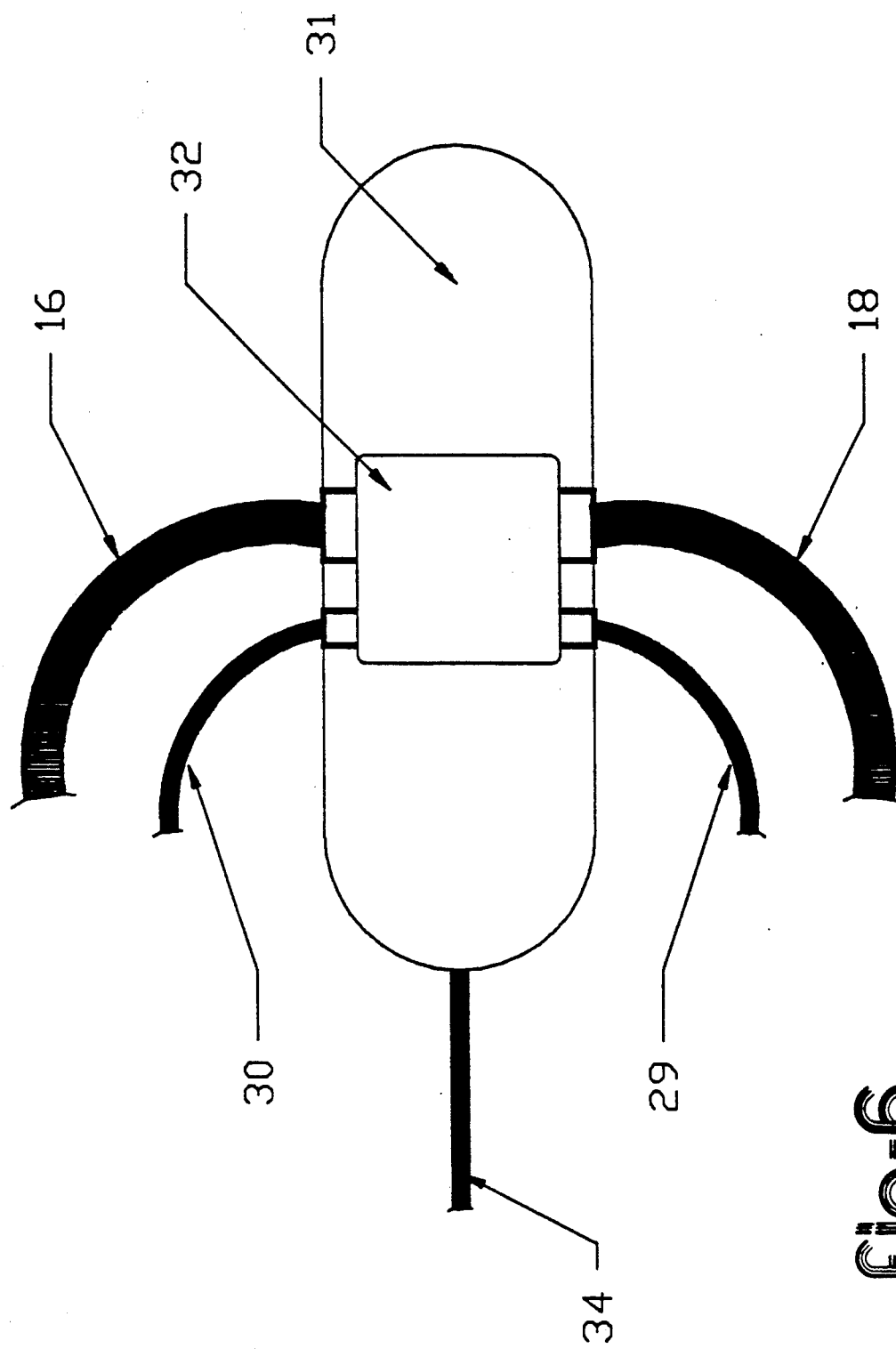
FIG. 6 is a diagram of the components comprising the hydraulic pump, solenoids and hydraulic valve assembly of the present invention.
Figure 7:
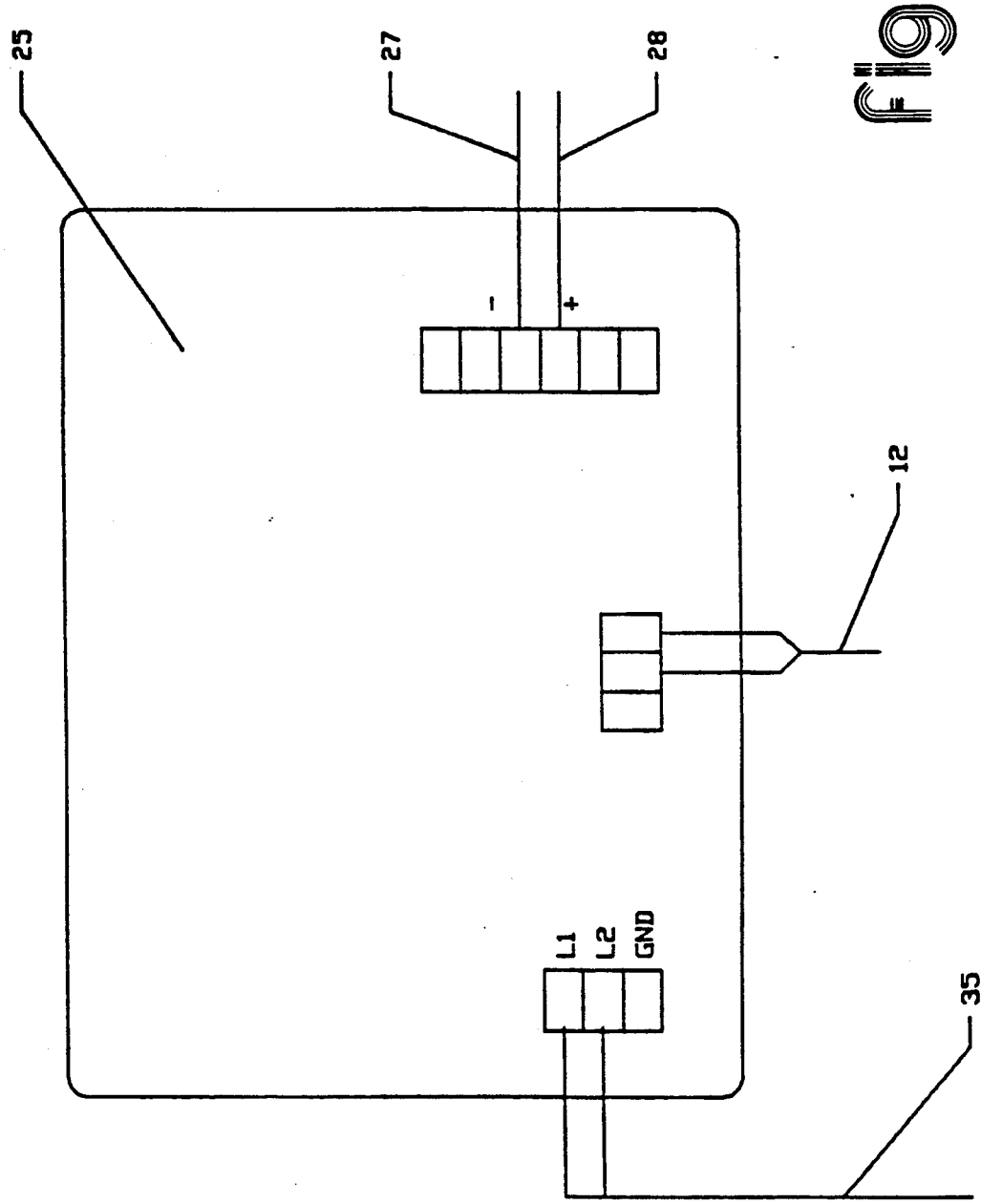
FIG. 7 is a diagram of the connections between the ultrasonic level meter, transducer, PLC, operator interface panel, hydraulic pump motor, control relays, solenoids, and power supply of the present invention.
Figure 8:
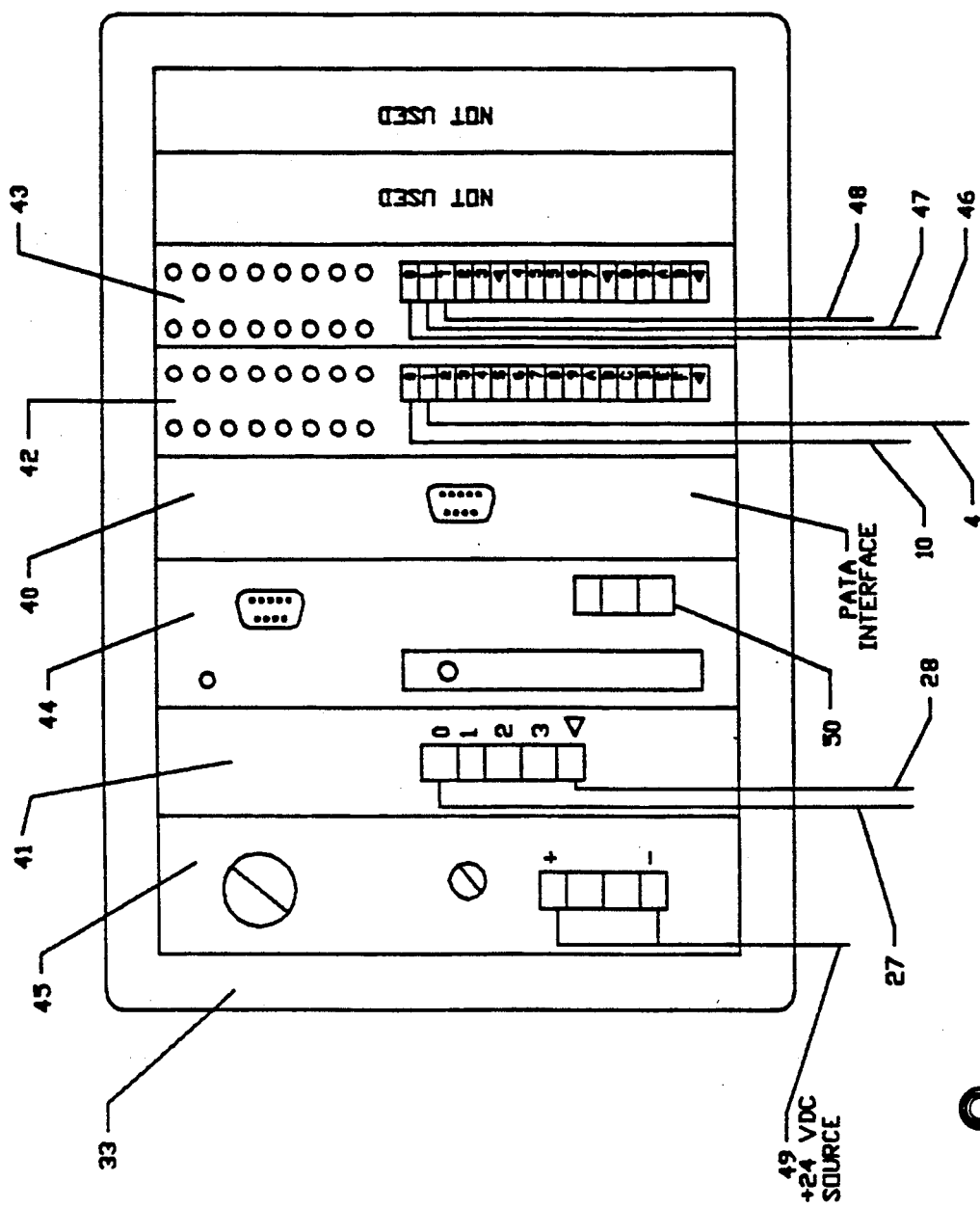
FIG. 8 is a diagram showing the position and placement of the input card, output card, analog input card, operator panel interface card, central processing unit, and PLC power supply.
Figure 9:
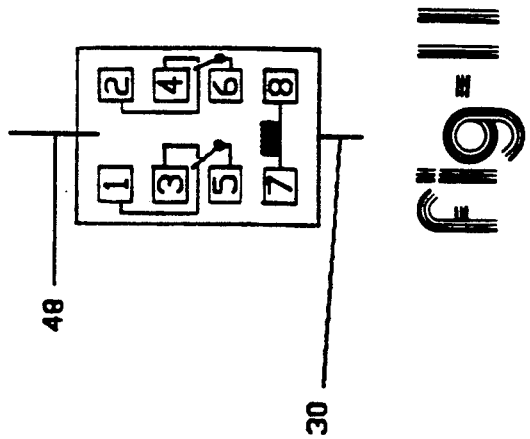
FIG. 9 is a diagram of the hydraulic pump motor relay of the present invention.
Figure 10:
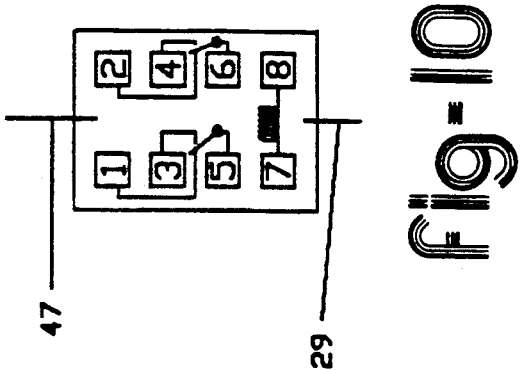
FIG. 10 is a diagram of the up solenoid relay of the present invention.
Figure 11:
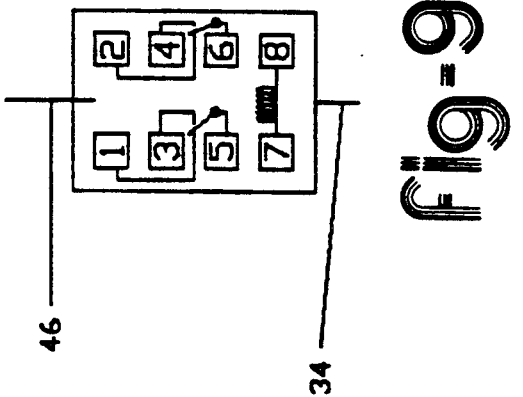
FIG. 11 is a diagram of the down solenoid relay of the present invention.

As the level changes inside the Stilling Well 38, a Transducer 9, which in the preferred embodiment is ultrasonic or a Submersible Depth Transducer, senses the change and sends a corresponding signal back to the Level Meter 25 via the coaxial cable 12 and from thence to the PLC analog input module 41 via the interconnect wires 27,28 as shown in FIGS. 2, 5, 7 and 8. In case of the Submersible Depth Transducer directly to the Analog Input Module 41. The Ultrasonic Transducer 9 is mounted in a Mounting Bracket 8 and attached to the wall of the Stilling Well 38 by Stainless Steel Anchors 24 as shown in FIG. 4. The Mounting Bracket 8 is designed to allow minor adjustment of the Ultrasonic Transducer 9 for minute calibration of level during installation. The Ultrasonic Level Meter 25 processes the signal according to the parameters set up for the installation and sends an analog signal signal of 4-20 ma to the PLC analog input card 41. The same process can be achieved by using a Submersible Depth transducer and using the analog signal directly interfaced to the PLC Analog Input Module 41.

Referring to FIGS. 7-11, the PLC processes the data according to its control logic i.e. programming or OP-Code stored in an EEPROM and by manipulating the Hydraulic Pump Motor Relay 46, the Up Solenoid 47, and the Down Solenoid 48 is able to affect the following equipment to achieve the set point level control. The desired level setpoint is entered into the PLC by means of the Operator Interface Panel 33 and then into the PLC program by the Operator Panel PLC Interface 40. When the setpoint is exceeded the PLC turns on the Hydraulic Pump 31 and the appropriate output to either turn on the Up Solenoid Relay 47 or the Down Solenoid Relay 48. When the Up or Down Solenoid Relays are energized the Hydraulic Valve Assembly 32 allows flow of Hydraulic fluid to the Hydraulic Cylinder 6 by means of the Hydraulic Hoses Up 16 and Down 18 The Hydraulic Cylinder 6 is attached to the wall by means of a Mounting Bracket 17 secured by stainless steel anchors 24. The Hydraulic Cylinder 6 is positioned a set distance above the Gate Valve 37 depending on the amount of stroke needed to open the valve. The Mounting Bracket 17 is designed to hold the Hydraulic cylinder away from the wall a distance equal to the distance of the Swivel Eye Connector 36 mounted on the Gate Valve 37. Connected between the Hydraulic Cylinder 6 and the Swivel Eye Connector 36 is a Threaded Stainless Steel Rod 20 which connects at the Hydraulic Cylinder 6 by means of a Coupling 19 and at the Gate valve 37 by threading into the Swivel Eye Connector 36. Attached to the Threaded Stainless Steel Rod 20 is a Limit Switch Actuator 21 which serves to erase the Upper Limit Switch 5 and the Lower Limit Switch 22. The limit switches are positioned to indicate when the travel of the Gate Valve 37 has reached full open or closed, by closing the contacts in the limit switches 5, and 22 respectively. A signal is thereby transmitted by means of the Upper Limit Electrical Cable 4 and The Lower Limit Electrical Cable 10 to the Input Card 42 of the PLC. The limit switches 5, 22 are adjustable by means of the Limit Switch Mounting Bracket 23. All the connections to the Limit Switches 5,22 and the Hydraulic Hoses 16, 18 are routed through the Junction Box 15 and from thence through the Conduits 14 to the PLC enclosure and the Hydraulic Pump valve assembly 32. By manipulating the various Relays and Solenoid Valves the flow of Hydraulic Fluid through the Hydraulic Cylinder Can be determined and thereby the opening and closing the Gate Valve. By proper Adjustment of the response of the PID Loop Algorithm, The PID Loop can be tuned to respond to the Setpoint entered to the PLC via the operator interface panel and the actual level sensed by the Ultrasonic level meter. By the corresponding action on the hydraulic cylinder and gate valve the flow of water through the chamber to the output is materially affected due to the effective area of the orifice regulated by the position of the gate valve, and thence a corresponding change in the level found in the stilling well. Henceforth the operation of the associated equipment can be manually manipulated to produce opening and closing of the gate valve by setting the control loop to manual and activating the proper push-button on the operator interface panel which inputs the action directly to the PLC to open or close the valve by the aforesaid action of the equipment. By using the Serial Communication Port which is part of the Numeric Central Processor Module 44, various devices can be used for output of data. Communications to a Serial Printer would be one such example of this type of communication. Also it would be possible to program the PLC to manipulate the contact output module to trigger devices which utilize contact closures pulsed signals or voltage outputs to operate. One such example of this would be to operate a Sampler typically needed in the management of sewage overflow devices.

Thus has been shown and described a novel method of controlling flow in a Sewage Regulator which fulfills all the objectives and advantages sought therefore. Many changes, modifications, variations and other uses and applications of the subject invention will, however, become apparent to those skilled in the art after considering this specification and the accompanying drawings which disclose the preferred embodiments thereof. All such changes, modifications, variations, and other uses and applications which do not depart from the spirit and scope of the invention are deemed to be covered by the invention which is limited only by the claims which follow.

What is claimed is:

1. An apparatus for controlling the flow of sewage in a sewage regulator having a gate valve, wherein said gate valve controls the flow of sewage from an inlet pipe to an outlet pipe, said apparatus comprising:

a programmable logic controller having a numerical central processing unit, an analog input module, a contact output module, an operator interface module, a digital input module, a serial communications port and at least one operator interface panel;

a meter means for generating a variable analog output signal connected to said analog input module proportional to the depth of sewage within said sewage regulator;

a hydraulic system including a hydraulic pump, a hydraulic cylinder operatingly coupled to said pump, a valve assembly connected to said pump for directing the flow of hydraulic fluid to the cylinder, wherein said valve assembly is operatively connected to at least one solenoid which is operatively connected to said programmable logic controller contact output module for controlling operation of said hydraulic cylinder and said hydraulic cylinder is connected to said gate valve;

a pair of limit switches actuated by a lever coupled to said hydraulic cylinder to indicate full open and full closed positions of said gate valve, said pair of limit switches being further operatingly connected to the programmable logic controller digital input module;

an operator interface panel coupled to the programmable logic controller for displaying messages, and a keyboard for receiving control input for operating said programmable logic controller; and control logic stored in the programmable logic controller for processing the analog output signals of the level meter in conjunction with the control input from the operator interface panel to control the activation of the hydraulic system based upon the analog output and control input signals, thereby regulating the flow of sewage passing through the sewage regulator.

2. The apparatus defined in claim 1 wherein the control logic is a computer program stored in an EEPROM.

3. The apparatus defined in claim 1 where the control logic allows the operation of the apparatus to be manually manipulated through direct input to the keyboard.

4. The apparatus defined in claim 1 where said serial port is connected to a printer for producing printed output.

5. The apparatus defined in claim 1 wherein said meter means is an ultrasonic level meter.

6. The apparatus defined in claim 1 wherein said meter means comprises a submersible depth transducer.

7. An apparatus for controlling the flow of sewage in a sewage regulator having a sewage inlet and a sewage outlet and a gate valve interposed therebetween for regulating the flow of sewage through said regulator, the regulator further including a stilling well in open fluid communication to the flow of sewage through said regulator, said apparatus comprising:

a hydraulic assembly for actuating the gate valve between a open position and a closed position;

a limit switch affixed to the hydraulic assembly for indicating the open and the closed positions of the control valve;

a means for measuring the level of sewage in said stilling well, said means for measuring producing an output signal indicating the level of sewage in said stilling well; and a programmable logic controller electrically connected to said hydraulic assembly, said limit switch and said means for measuring wherein said programmable logic controller controls the activation of the hydraulic assembly based upon the output signal, thereby regulating the flow of sewage passing through the sewage regulator in relation to the level of sewage in the stilling well.

* * * * *